United States Patent
Chen et al.

(10) Patent No.: US 8,032,766 B2
(45) Date of Patent: Oct. 4, 2011

(54) MACHINE BOOT UP PROTECTION STRUCTURE FOR PARALLEL POWER SUPPLY EQUIPMENT

(75) Inventors: Tsung-Chun Chen, Taipei Hsien (TW); Yu-Cheng Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 652 days.

(21) Appl. No.: 11/271,831

(22) Filed: Nov. 14, 2005

(65) Prior Publication Data
US 2007/0109702 A1    May 17, 2007

(51) Int. Cl.
*G06F 1/00* (2006.01)
(52) U.S. Cl. ........................................ 713/300
(58) Field of Classification Search ............... 713/1, 300, 713/320, 340
See application file for complete search history.

(56) References Cited

U.S. PATENT DOCUMENTS

| | | | |
|---|---|---|---|
| 6,137,190 A * | 10/2000 | Gatti | 307/80 |
| 6,233,693 B1 * | 5/2001 | Berglund et al. | 713/340 |
| 6,493,243 B1 * | 12/2002 | Real | 363/17 |
| 6,504,266 B1 * | 1/2003 | Ervin | 307/29 |
| 6,651,178 B1 * | 11/2003 | Voegeli et al. | 713/300 |
| 7,034,569 B1 * | 4/2006 | Balasubramanian et al. | 326/38 |
| 7,272,733 B2 * | 9/2007 | Pomaranski et al. | 713/320 |
| 7,302,600 B2 * | 11/2007 | Bibikar et al. | 713/324 |
| 7,770,044 B2 * | 8/2010 | Bibikar et al. | 713/330 |
| 2002/0066045 A1 * | 5/2002 | Layton et al. | 713/300 |
| 2003/0220719 A1 * | 11/2003 | Jiang et al. | 700/286 |
| 2004/0177283 A1 * | 9/2004 | Madany et al. | 713/300 |
| 2005/0034003 A1 * | 2/2005 | Sato et al. | 713/340 |
| 2005/0067899 A1 * | 3/2005 | Kawanishi et al. | 307/43 |
| 2006/0005060 A1 * | 1/2006 | Bibikar et al. | 713/330 |

* cited by examiner

*Primary Examiner* — Thomas Lee
*Assistant Examiner* — Jaweed A Abbaszadeh
(74) *Attorney, Agent, or Firm* — Muncy, Geissler, Olds & Lowe, PLLC

(57) ABSTRACT

A machine boot up protection structure for parallel power supply equipment provides a determination level to set the parallel power supply equipment in an ON condition. It has a control unit to receive a connection signal output by each of power supply units to compare with the determination level. If the comparison matches, all of the power supply units are activated to the ON condition. If the comparison does not match, all of the power supply units are set to an OFF condition. Thereby when the external power is not completely connected, some of the power supply units do not suffer from overloading and damaging.

8 Claims, 4 Drawing Sheets

MACHINE BOOT UP PROTECTION STRUCTURE FOR PARALLEL POWER SUPPLY EQUIPMENT

FIELD OF THE INVENTION

The present invention relates to a machine boot up protection structure for parallel power supply equipment and particularly to a protection structure that provides a machine boot up determination level to serve as a protection mechanism and harness the power supply equipment to start machine operation after having conformed to the determination level.

BACKGROUND OF THE INVENTION

The contemporary power supply equipment for large computers such as industrial computers or servers generally includes a plurality of parallel power supply devices connecting to a back panel. The back panel has a power distribution circuit to integrate and distribute DC power transformed from an external power to loads at the rear end. ON/OFF processes of the power supply devices are controlled by an external PS ON/OFF signal provided by an external controller (through a power supply switch or an I2C remote control). The back panel has a control unit to receive the PS ON/OFF signal and outputs a Remote ON/OFF signal to drive all power supply devices.

The large computers such as the industrial computers or servers usually are installed in a machine room. During installation, the external electric power has to be connected to the power supply devices before the computer can be installed. If the external power is interrupted or a portion of external power is missed during installation, or more than one external power is connected to the power supply equipment (such as external DC and AC power are connected at the same time), when machine boot up operation takes place for the computer, because of no machine boot up protection structure on the power supply devices, only a portion of the power supply devices that are connected to the external power can transform the external power to output. Other power supply devices that are not connected to the external power can receive the machine boot up signal issued by the control unit, but remain in an OFF condition because of no external power input. In such an abnormal condition, the starting power supply devices become overloaded. As a result, jumping or burn-out of the power supply devices could happen after the machine boot up. The cause of power supply devices burn-out is difficult to determine. Hence the entire set of the power supply equipment has to be sent back to the power supply producer for inspection and repairs. This is especially troublesome for the producer. The inspection and repairs resulting from poor problem determination not only incur extra costs, also cause damage to company reputation and image.

SUMMARY OF THE INVENTION

Therefore the primary object of the present invention is to solve the aforesaid disadvantages. The present invention provides a machine boot up determination level for parallel power supply equipment. It has a control unit to receive a connection signal output by each power supply unit and compare with the determination level. If the comparison matches, all the power supply units are activated to an ON condition. If the comparison does not match, all the power supply devices are set to an OFF condition. Therefore in the event that connection of the external power is incomplete on the power supply units, overloading does not occur to some of the power supply units and damage can be prevented.

Another object of the invention is to connect an alert device to the control unit. In the event that the machine boot up condition of the power supply equipment does not match the determination level, the control unit outputs an alert signal to the alert device to inform operators to reconnect the external power.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
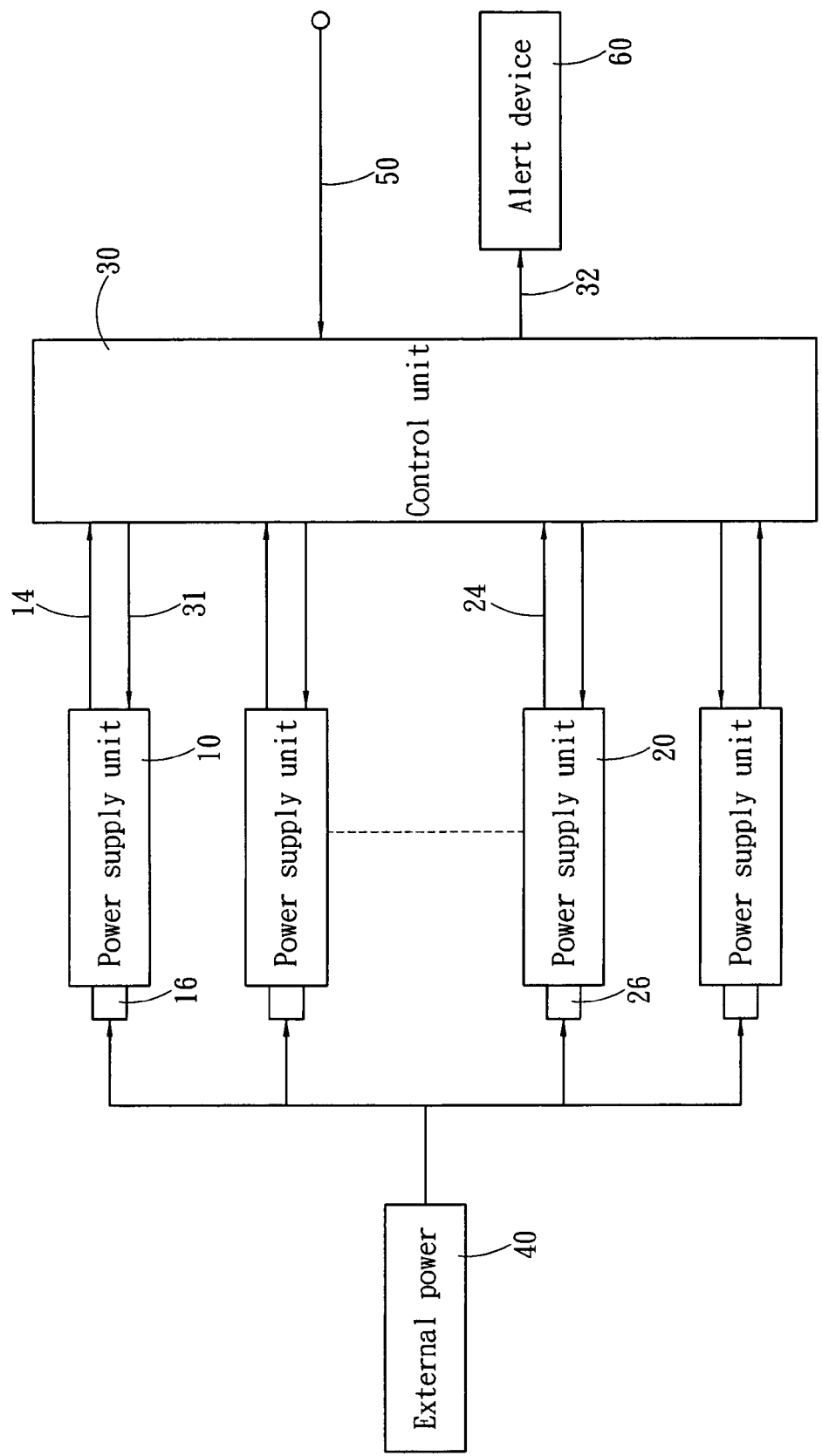
FIG. 1 is a schematic power supply equipment connection chart of the present invention.
Figure 2:
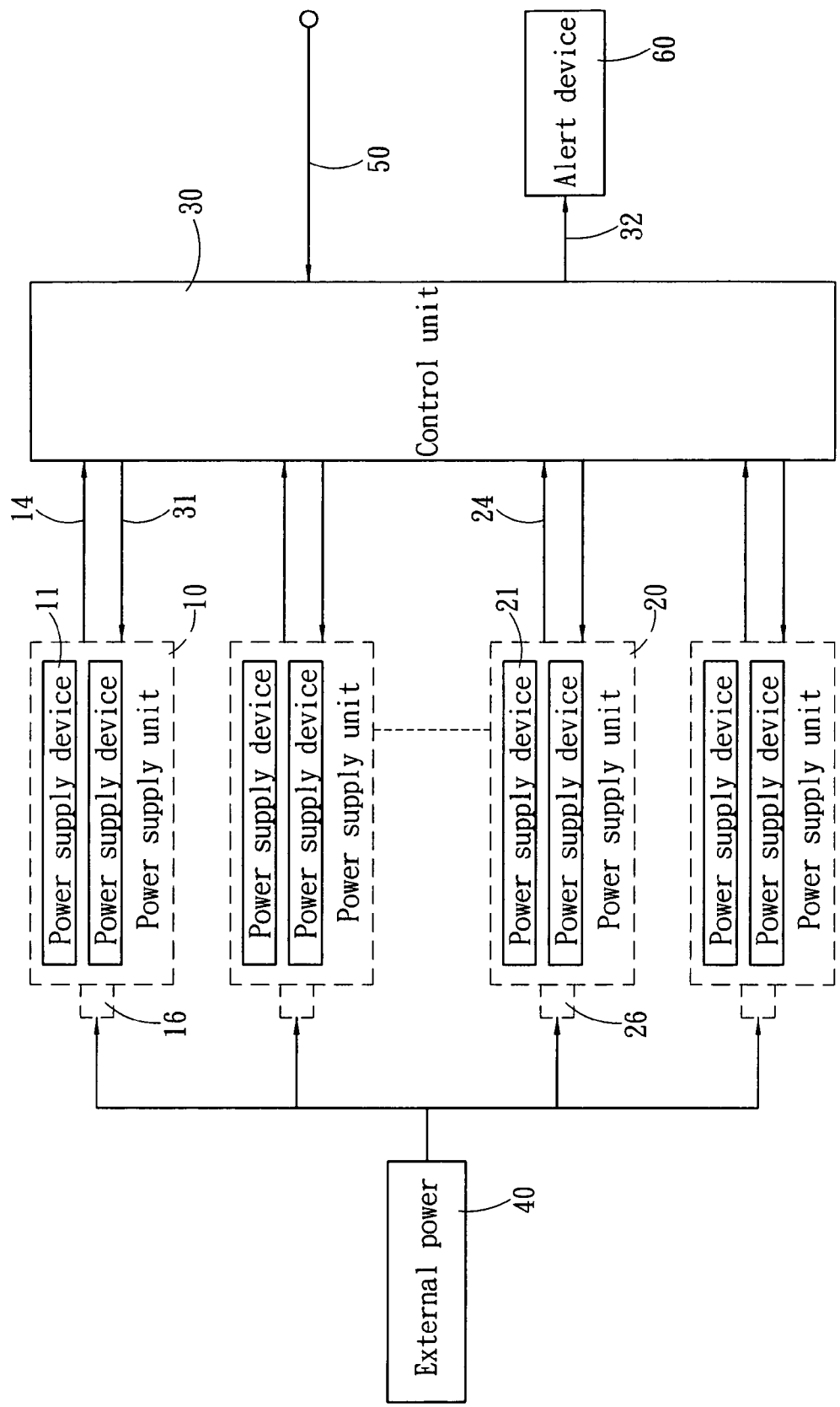
FIG. 2 is another schematic power supply equipment connection chart of the present invention.

Please refer to FIG. 1 for the machine boot up protection structure of parallel power supply equipment of the invention. The power supply equipment includes a plurality of parallel power supply units 10 and 20. The power supply units 10 and 20 have respectively a power input end 16 and 26 connecting to an external power 40. The external power 40 supplies power to the power supply units 10 and 20 in a joined and parallel manner, or a plurality of external power 40 (some are external DC power and others are external AC power) supply respectively the power to the power supply units 10 and 20 that are coupled in parallel and transformed to be output. While the power supply units 10 and 20 are connected to the external power 40, they output respectively a connection signal 14 and 24. Each of the power supply units 10 and 20 has a power supply device 11 and 21, or as shown in FIG. 2, consists of a plurality of power supply devices 11 and 21. And each of the power supply devices 11 and 21 has an independent or common power input end 16 and 26 to be connected to the external power 40. Moreover, the power supply units 10 and 20 are coupled to form a N+M (NO1 and MO1) backup power supply equipment. And each of the power supply units 10 and 20 is electrically connected to a control unit 30 on a back panel. When the control unit 30 receives an external PS ON/OFF signal 50, it outputs a Remote ON/OFF signal 31 to set the power supply units 10 and 20 in an ON or OFF condition. In addition, the control unit 30 has a determination level to be compared with the connection signals 14 and 24 output from the power supply units 10 and 20. When the comparison matches, all of the power supply units 10 and 20 are set in the ON condition. If the comparison does not match, all of the power supply units are set in the OFF condition.

Figure 3:
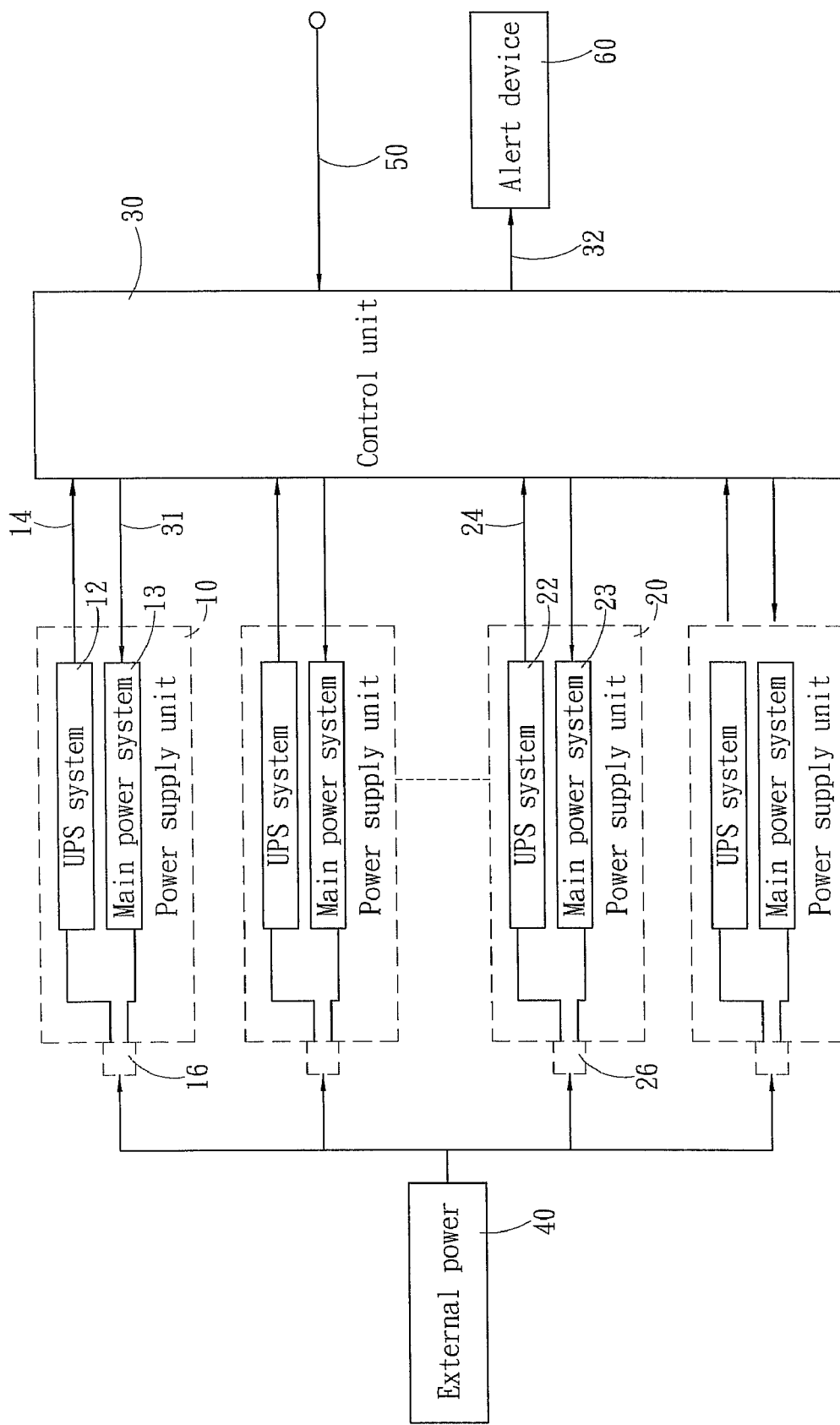
FIG. 3 is a schematic power supply equipment signal transmission chart of the present invention.

Refer to FIG. 3 for a signal transmission control method of the invention. The power supply units 10 and 20 have respectively a main power system 13 and 23, and a Uninterruptible Power Supply (UPS) system 12 and 22. When the UPS systems 12 and 22 are connected to the external power 40, they generate electric power and output the connection signals 14 and 24 to the control unit 30. The control unit 30 receives the connection signals 14 and 24, and compares with the determination level. If the external PS ON/OFF signal 50 is received and matched with the determination level, the control unit 30 outputs the Remote ON/OFF signal 31 to activate the power supply units 10 and 20 to perform machine boot up operations. If the comparison does not match, the control unit 30 does not issue the Remote ON/OFF signal 31, and the power supply units 10 and 20 remain in the OFF condition. Then machine boot up cannot be activated, and operators can inspect the connecting condition of the external power 40.

Figure 4:
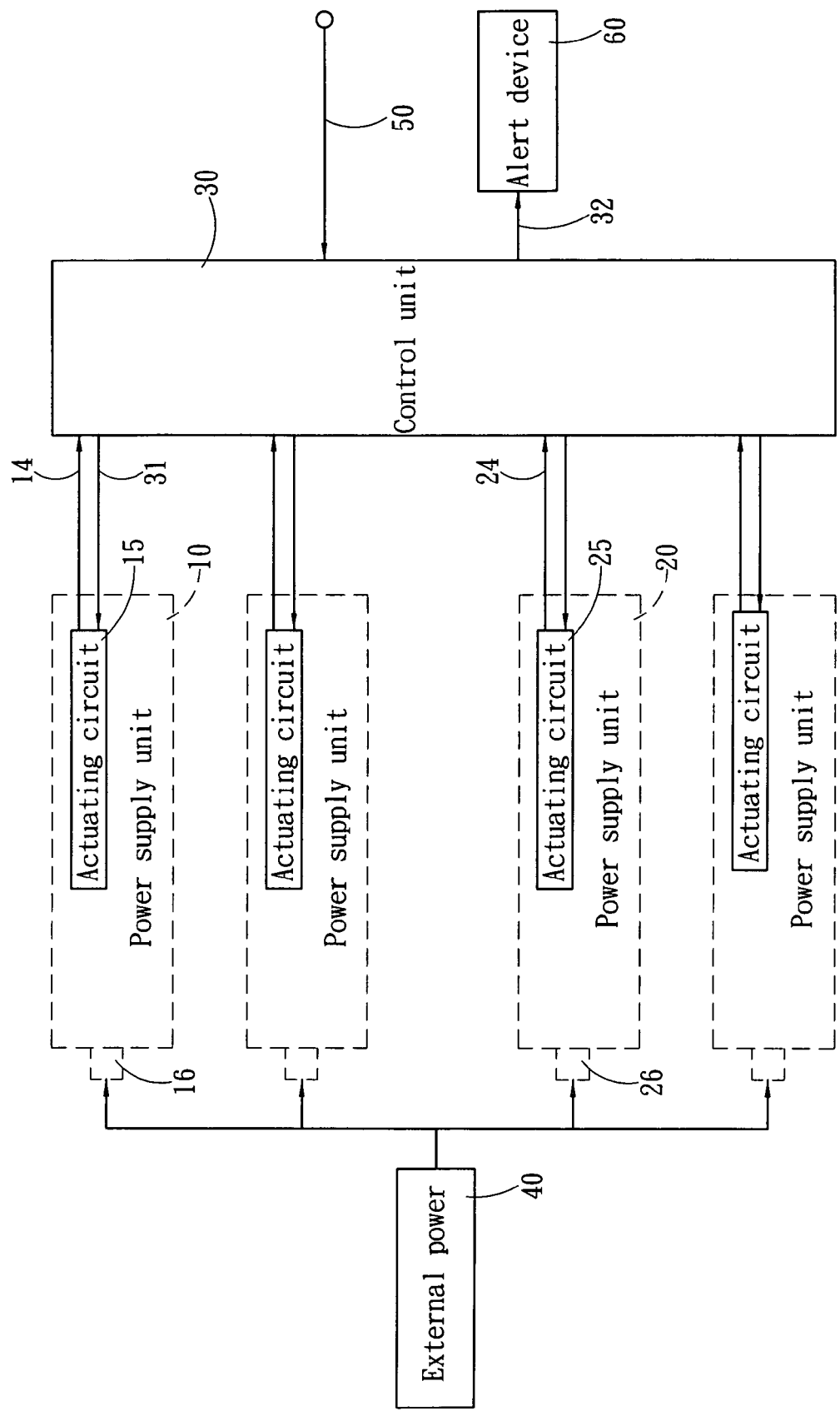
FIG. 4 is another schematic power supply equipment signal transmission chart of the present invention.

Refer to FIG. 4 for another signal transmission control method of the invention. The power supply units 10 and 20 have respectively an actuating circuit 15 and 25. When the control unit 30 receives the external PS ON/OFF signal, it first outputs the Remote ON/OFF signal 31 to activate the actuating circuits 15 and 25 to set the power supply units 10 and 20 in an ON condition. The actuating circuits 15 and 25 feed back the connection signals 14 and 24 to the control unit 30. If the connection signals do not match the determination level of the control unit 30, the control unit 30 outputs the Remote ON/OFF signal 31 to activate the actuating circuits 15 and 25 to set the power supply units 10 and 20 in an OFF condition. If the comparison matches the determination level of the control unit 30, the control unit 30 does not output the Remote ON/OFF signal 31.

Furthermore, in order to enable operators to clearly determine whether the external power 40 is not completely connected that results in machine boot up failure, the control unit 30 of the invention is coupled to an alert device 60 such as a buzzer or indication light. When the connection signals 14 and 24 do not match the determination level, the control unit 30, in addition to keep the power supply units 10 and 20 in the OFF condition, also outputs an alert signal 32 to the alert device 60 to inform the operators that the machine boot up failure is caused by an abnormal condition of incomplete connection of the external power 40. This helps the operators to do inspection.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A machine boot up protection structure for parallel power supply equipment, comprising:
   a plurality of parallel power supply units each having a power input end to connect to an external power; and
   a control unit connecting electrically to each power supply unit and receiving an external PS ON/OFF signal and generating a first Remote ON/OFF signal, the control unit further having a determination level,
   wherein each of the power supply units has an actuating circuit receiving the first Remote ON/OFF signal to set each of the power supply units in the ON condition and each of the actuating circuits feeding back a connection signal to the control unit having multiple comparisons with each of the connection signals being compared with the determination level, the control unit outputting a second Remote ON/OFF signal to control each of the actuating circuits to set the power supply units in the OFF condition when any of the comparisons do not match.

2. The machine boot up protection structure of claim 1, wherein each of the power supply units includes at least one power supply device.

3. The machine boot up protection structure of claim 2, wherein the power supply units are coupled to form a N+M backup power supply equipment, and said N≧1, M≧1.

4. The machine boot up protection structure of claim 2, wherein the power supply units consist of N+1 power supply devices that share one common power input end.

5. The machine boot up protection structure of claim 2, wherein the power supply units consist of N+1 power supply devices each has one power input end.

6. The machine boot up protection structure of claim 1, wherein the control unit is connected to an alert device, the control unit sending an alert signal to the alert device when the connection signal does not match the determination level.

7. The machine boot up protection structure of claim 1, wherein the power supply units are coupled in a parallel manner to receive the same external power.

8. The machine boot up protection structure of claim 1, wherein the power supply units are connected to a plurality of external power and coupled in a parallel manner to output transformed electric power.

* * * * *